Sept. 1, 1936.   C. S. COMSTOCK   2,052,606

TOWEL RACK

Filed March 14, 1935

INVENTOR
Clark S. Comstock
BY
Kenyon & Kenyon
ATTORNEYS.

Patented Sept. 1, 1936

2,052,606

UNITED STATES PATENT OFFICE 2,052,606

TOWEL RACK

Clark S. Comstock, Great Barrington, Mass.

Application March 14, 1935, Serial No. 10,979

9 Claims. (Cl. 211—123)

This invention relates to towel racks and more especially to that type of towel rack comprising a pair of brackets attached to a wall and supporting between them a rod over which the towel is hung. In such towel racks, the rod is usually round or polygonal in cross-section and is made of metal, glass or other material having a smooth surface which presents no resistance to slippage of the towel. With this type of rod, the towel must be substantially balanced on the rod or else it will slide off and cause inconvenience.

An object of this invention is a slippage preventing towel rack which is efficient in operation, is simple and inexpensive to manufacture and in which the slippage preventing means can be readily renewed or replaced.

Other objects, novel features and advantages of this invention will become apparent from the following specification and accompanying drawing, wherein.

Figures 1, 2:
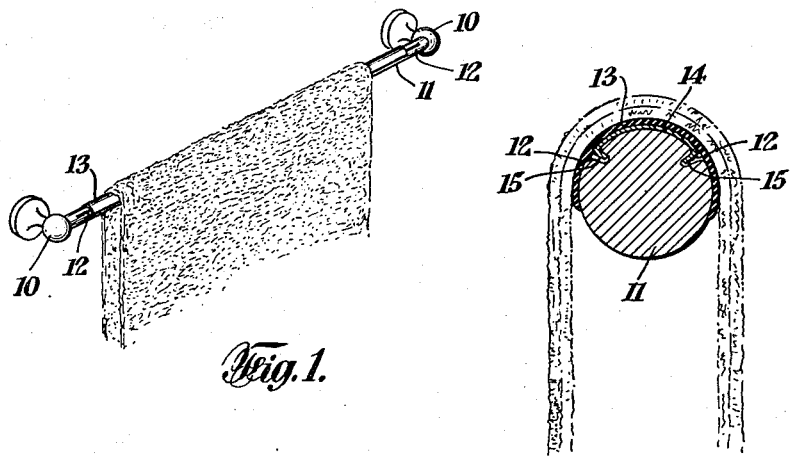
Fig. 1 is a perspective view of a towel rack embodying the invention.
Fig. 2 is a cross-section through the rod of Fig. 1.

Referring more especially to Figs. 1 and 2, the towel rack comprises two brackets 10 having suitable means for fastening them to a wall and having sockets in their outer ends in which are received the ends of a rod 11, which may be composed of any suitable material, may be solid or hollow and may be circular or polygonal in cross-section, but for illustration purposes is a solid glass rod of circular cross-section. The rod is provided with two longitudinally extending cuts or slots 12 which lie in the upper half of the rod's periphery.

An arcuate strip 13 of rubber or other suitable friction material surrounds a substantial portion of the rod 11 and has molded therein an arcuate strip 14 having its edges forming two inwardly extending members 15 received in the grooves 12. The edges of the strip 13 extend beyond the members 15 and serve to prevent liquid from getting into the slots 12.

The slots 12 may extend the full length of the bar 11 or may terminate short of the ends thereof as shown in Fig. 1. If the slots extend the full length of the bar, the strip 13 may likewise extend the full length of the bar and have its ends received in the sockets in the brackets 10. While the members 15 have been described and shown as being the inturned edges of a metal strip extending the full length of the friction strip, the members 15 may also be formed as small tongues extending from a long strip or a plurality of short strips may be substituted for the long strip 14, said short strips being appropriately spaced throughout the length of the strip of friction material.

Figures 3, 4:
Figs. 3 and 4 are views similar to Fig. 2 of modified embodiments of the invention.

In the modification shown in Fig. 3, the bar 21 is a metal tube of substantially square cross-section. The upper portion of the rod is flattened by having the upper ends of the two top sides bent inwardly into horizontal position and cut off to provide a longitudinally extending slot 22. The friction strip 23 is triangular in cross-section and completes the square shape of the rod. A metal strip 24 is molded into the friction strip 23 and has perpendicular edges 25 extending into the slot 22, the members 25 being provided with offsets 26 which serve to lock the strip 23 in position. The lateral edges of the strip 23 extend beyond the ends of the slot 22 and serve to prevent liquid getting into the interior of the rod 21 by way of the slot 22.

In the modification of Fig. 4, the rod 31 comprises a metal tube longitudinally slotted throughout its length at 32. The tube is enclosed in a sheath 31a of celluloid or similar material having its edges bent back over the edges of the slot 32. A longitudinal strip 33 of friction material has molded therein a metal strip 34, the edges of which are formed as members 35 which fit around and clasp the edges of the celluloid sheath 31a to the edges of the tube 31. Here also, the edges of the friction strip 33 extend beyond the edges of the slot and prevent liquid from getting thereto.

In each of the modifications above described, the towel rack is provided with means for preventing slippage of the towel and the structure of each modification is such as to be conducive to cheap manufacturing cost and efficient production. Also, in each modification, the friction material may readily be replaced should it become worn.

In the modification disclosed in Fig. 2, the friction strip is put in place merely by opening it out slightly and pressing it downwardly over the bar until the members 15 snap into the sockets 12 or if the slots run the full length of the rod, the strip may be slipped on from either end of the rod.

In the modification shown in Fig. 3, the ends of the members 25 are inserted in the slot 32 and pressed inwardly, the members 25 moving toward each other by reason of their own resiliency and then snapping back into locking position.

In the modification disclosed in Fig. 4, the friction strip is slid on to the tube longitudinally with the members 35 embracing the turned back edges of the celluloid sheath which in turn are bent over the edges of the tube 31.

The friction strip of Fig. 2 may either be pried off or slid off when it is desired to make replacement. The friction strip of Fig. 3 may be pried off, the members 25 yielding for that purpose. The friction strip of Fig. 4 may be removed by sliding the same lengthwise of the rod.

Thus, it is apparent that the foregoing structures embody towel racks which present resistance to towel slippage and which are capable of efficient production at low manufacturing cost.

I claim:

1. A towel rack comprising spaced brackets having sockets, a rod having its ends received in said sockets, a friction strip extending longitudinally of and conforming to the contour of said rod, and metallic members molded in said friction strip, said rod being slotted to receive said members to fasten the friction strip to the rod and said strip being laterally extended beyond said metallic members to exclude liquid from the slotted portion of the rod.

2. A towel rack comprising spaced brackets having sockets, a rod having its ends received in said sockets, said rod having a pair of spaced longitudinal slots, a friction strip extending longitudinally of said rod and embracing a substantial portion thereof, and metallic members molded in said strip and extending into said slots.

3. A towel rack comprising spaced brackets having sockets, a rod having its ends received in said sockets, said rod having a pair of spaced longitudinal slots, a friction strip extending longitudinally of said rod and embracing a substantial portion thereof, and a metallic strip molded in said friction strip, said metallic strip having members extending therefrom into said slots.

4. A towel rack comprising spaced brackets having opposing sockets, a rod having its ends received in said sockets, said rod being tubular and of substantially rectangular cross-section, portions of two sides of said rod being bent inwardly to define a flat surface having a slot extending lengthwise of said rod, a friction strip resting on said surface, metallic members molded in said strip and projecting through said slot, said strips having offset portions to oppose withdrawal thereof through the slot.

5. A towel rack according to claim 4 in which said members comprise perpendicular edges of a metal strip molded in said friction tube.

6. A towel rack according to claim 4 in which said members constitute the edges of a metal strip molded in said friction strip.

7. A towel rack comprising spaced brackets having opposing sockets, a rod having its ends received in said sockets, said rod comprising a metal tube longitudinally slotted, a sheath enclosing said tube and having its edges bent over the edges of said slot, a friction strip extending longitudinally of said tube and embracing a substantial portion thereof, and metallic members carried in said strip, said metallic members being shaped to overlie the end portions of said sheath and hold the same in place and also attach said strip to said tube.

8. A towel rack according to claim 7 in which the sheath is composed of celluloid or the like and said members constitute the edges of a metal strip molded in said friction strip.

9. A towel rack comprising spaced brackets having sockets, a rod having its ends received in said sockets, a friction strip extending longitudinally of and conforming to the contour of said rod, and attaching means carried by said friction strip, said rod being slotted to receive said means to fasten the friction strip to the rod and said strip being of sufficient lateral extent to exclude liquid from the slotted portion of the rod.

CLARK S. COMSTOCK.